United States Patent [19]
Müller

[11] 3,984,749
[45] Oct. 5, 1976

[54] PROCESS AND ARRANGEMENT FOR THE OPERATION OF RECHARGEABLE ZINC ELECTRODES

[75] Inventor: Jochen Müller, Norf, Germany

[73] Assignee: Firma Deutsche Automobilgesellschaft mbH, Hannover, Germany

[22] Filed: Oct. 11, 1974

[21] Appl. No.: 514,067

[30] Foreign Application Priority Data
Oct. 27, 1973 Germany............................ 2353926

[52] U.S. Cl...................................... 320/2; 429/50
[51] Int. Cl.² .................... H02J 7/00; H01M 43/00
[58] Field of Search .................................. 320/2–6, 320/21, 54; 136/136, 140, 141, 6 R, 181, 86

[56] References Cited
UNITED STATES PATENTS
| | | | |
|---|---|---|---|
| 3,497,387 | 2/1970 | Amiet............................ | 136/140 X |
| 3,639,173 | 2/1972 | Stachurski...................... | 136/6 R X |

FOREIGN PATENTS OR APPLICATIONS
| | | | |
|---|---|---|---|
| 1,094,503 | 12/1954 | France................................. | 320/4 |

Primary Examiner—J D Miller
Assistant Examiner—Robert J. Hickey
Attorney, Agent, or Firm—Craig & Antonelli

[57] ABSTRACT

A process for the operation of rechargeable zinc electrodes in galvanic cells with the aid of a residual discharge, which comprises subjecting the rechargeable zinc electrode in a cell after a normal discharge to a residual discharge by connecting with at least one auxiliary electrode within said cell.

26 Claims, 3 Drawing Figures

PROCESS AND ARRANGEMENT FOR THE OPERATION OF RECHARGEABLE ZINC ELECTRODES

This invention relates to a process and arrangement for the operation of rechargeable zinc electrodes subjected to a secondary or residual discharge in the discharge half cycle and concerns, in detail, the conductance of the residual discharge process, as well as an arrangement suitable for this purpose.

Zinc is a preferred anode material for galvanic cells, because this substance has a high mass-related capacity (Ah/kg.) and because the galvanic cells operating with zinc anodes can yield a high voltage. Besides, zinc is readily available commercially in sufficient amounts and at nominal cost.

An essential disadvantage in the use of zinc as the anode material for secondary cells resides in that the cycle number of such cells is rather low. These low cycle numbers are due to:

1. a dendritic deposition of the zinc during the charging of the electrode (short-circuiting with the counter electrode);
2. a collection of active material on the lower portion of the electrode (bulge formation or sharp change) which cannot be removed by a normal discharge and which grows after several cycles to the counter electrode; and/or
3. a dropping of active material to the bottom of the cell (e.g. by slurrying or shedding).

While attempts to prevent the dendrite formation have been more or less successful (e.g. charging with pulsating current, circulating the electrolyte, use of electrolyte additives, effecting deposition of zinc on coarse-pored carrier structures, use of low current densities, employing improved separators, and use of calcium zincate electrodes), it has not been possible heretofore to prevent the accumulation of zinc in the lower portion of the electrode and on the bottom of the cell and thus to substantially increase the cycle number — while maintaining high mass-related capacities.

Endeavors have been known in the prior art (D. B. Boden and E. Pearlman, 8th power Sources Symposium, Brighton 1972; E. A. Rishavy, W. D. Bond, and T. A. Zechin, SAE-Paper 670, 175 [1967]) to increase the cycle number of zinc electrodes in nickel oxidezinc cells with the aid of a residual discharge with low current, by short-circuiting the zinc electrode via a resistor with the nickel oxide electrode following the normal discharge. However, the regeneration of the zinc electrode takes place only under simultaneous development of hydrogen at the nickel oxide electrode. This, however, substantially shortens the lifetime of the nickel oxide electrode. Another disadvantage resides in that material which has dropped off and lies on the bottom of the cell cannot be regenerated. Besides, the residual discharge by way of the nickel oxide cathode cannot be effected after each cycle, because the damage to the nickel oxide electrode due to the evolution of hydrogen results in a rapid destruction of this electrode.

The invention is based on the problem of providing a process for the residual discharge of zinc electrodes which makes it possible to impart to rechargeable zinc electrodes substantially higher cycle numbers, while maintaining high mass-related capacity, avoiding the above-described disadvantages, as well as an arrangement suitable for this purpose.

To solve this problem, the invention subjects the rechargeable zinc electrode, after the normal discharge, to a secondary or residual discharge, wherein this additional discharge takes place by way of one or more auxiliary electrodes. This residual discharge with minor current takes place until all, or almost the entire amount of the zinc remaining on the anode after the primary discharge has been oxidized.

The arrangement of the electrodes for the operation of the rechargeable zinc electrode is distinguished in that at least one auxiliary electrode is disposed in the cell in the proximity of the zinc electrode, but galvanically separate therefrom.

Depending on the arrangement and type of the auxiliary electrode, it is possible to redissolve active material which lies on the bottom or which is dropping to the bottom. Due to the residual discharge procedure, a uniform and high capacity of the zinc electrode is ensured at all times. Furthermore, in dependence on the arrangement of the auxiliary electrode, it is possible to utilize the evolution of gas at the auxiliary electrode for an intermixing of the electrolyte, which eliminates differences in concentration in the electrolyte and serves as a precaution against the change in shape of the electrode.

The residual discharge can be effected after each cycle (i.e. normal charge and discharge) or after a specific number of cycles.

The auxiliary electrode can consist of a metal which is resistant to alkalies, such as, for example, nickel, iron, cobalt, silver, or an oxide-coated metal, such as, e.g. nickel coated with nickel oxide.

In accordance with a preferred embodiment of the invention, the auxiliary electrode consists of a coated metal, wherein the applied layer has an especially low hydrogen overvoltage, such as, for example, nickel coated with Raney nickel or nickel boride.

Depending on the magnitude of the hydrogen overvoltage of the auxiliary electrode employed, the residual discharge can take place with an impressed current or spontaneously without utilization of an external energy source. The current flowing during the residual discharge must not become too great, since in such a case passivation phenomena can readily occur at the zinc electrode. On the other hand, the residual discharge time becomes very long in case the currents are too small. During the spontaneously occurring residual discharge (auxiliary electrode with a low hydrogen overvoltage), the magnitude of the current is determined practically only by the size of the surface of the auxiliary electrode.

The form of the auxiliary electrodes employed can be selected as desired. It is possible to use porous elements, expanded metals, metal nets, metal sheets, and similar metal components.

The arrangement of the auxiliary electrodes can likewise be chosen at will. Preferred arrangements are vertical disposition between the anode and cathode; horizontal placement underneath the anode; and an arrangement wherein the anode is surrounded by a U-shaped auxiliary electrode.

In any event, the auxiliary electrode is galvanically separated from the zinc electrode during the primary discharge yielding the useful current. The residual discharge of the zinc electrode is initiated by short-circuiting the zinc electrode with the auxiliary electrode, if the residual discharge takes place spontaneously via an auxiliary electrode of a small hydrogen overvoltage; otherwise, this residual discharge process is initiated by applying a voltage between the zinc electrode and the auxiliary electrode sufficient for the oxidation of the zinc and for the development of a corresponding amount of hydrogen at the auxiliary electrode.

This invention will be further understood from the following detailed description and by reference to the accompanying drawings which show three embodiments of the present invention wherein.

In the Figures, identical parts or elements have the same reference numerals.

Figure 1:
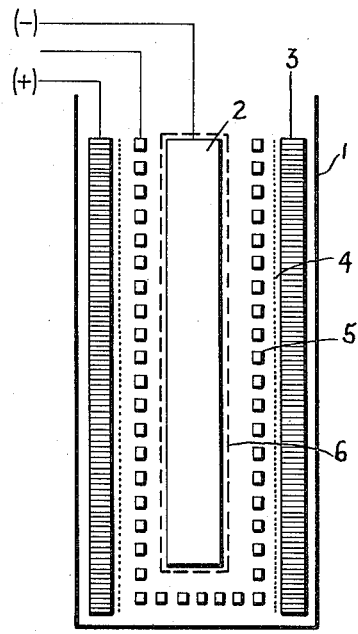
FIG. 1 shows one embodiment of a galvanic cell wherein the auxiliary electrode of this invention surrounds the anode in a U-shaped form.

Reference numeral 1 designates a housing of a galvanic cell, i.e., a battery container, made, as is customary, of an impact-and shock-resistant material, e.g. polypropylene. A zinc electrode 2 and a nickel oxide electrode 3 are located within the housing. Reference numeral 4 represents a synthetic-resin net (made of, for example polytetrafluoroethylene or polyamide felt), serving as a separator with respect to the nickel oxide electrode. A microporous separator 6 made of polypropylene is associated with the zinc electrode.

Figure 2:
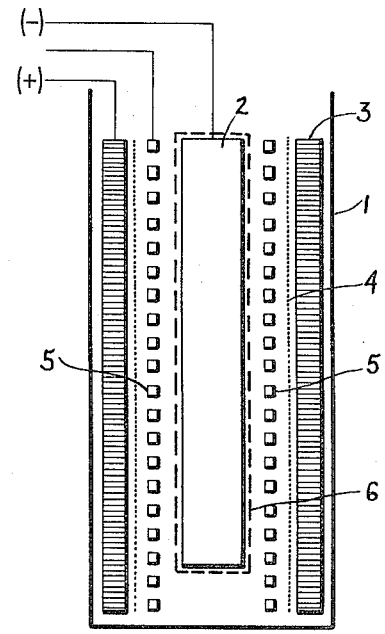
FIG. 2 illustrates an embodiment of a cell provided with a vertical positioning of the auxiliary electrode between the anode and cathode.
Figure 3:
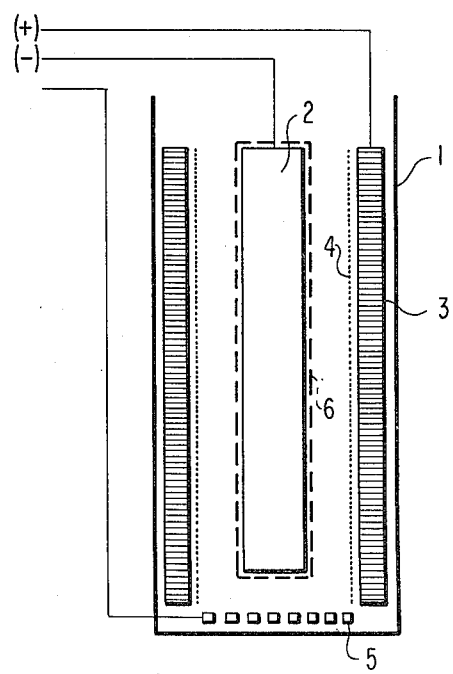
FIG. 3 shows another embodiment having a horizontal arrangement of the auxiliary electrode underneath the anode.

Reference numeral 5 denotes the auxiliary electrode of this invention which, in the embodiment of FIGS. 1 and 2, is arranged, respectively, at a distance of about 4mm. from the zinc electrode, while this spacing is about 6 mm. in the embodiment according to FIG. 3.

The invention will be explained in greater detail below with reference to specific examples. Example 1 describes an embodiment as shown in FIG. 1, and Example 2 relates to an embodiment according to FIG. 3 of the drawings.

EXAMPLE 1

A zinc/nickel oxide cell was constructed by arranging, in the center, a zinc electrode (60 × 80 × 3 mm., about 6 Ah) and, on each side, a nickel oxide electrode (60 × 80 × 4 mm., about 3.5 Ah). The cell contained 6 molar KOH as an electrolyte. The zinc electrode was surrounded, at a spacing of 4 mm., by a U-shaped nickel net coated with Raney nickel (60 × 150 mm.) adjoining the nickel oxide electrodes while isolated from the latter by a separator of polyamide felt. The cell was charged and discharged with a current of 3A. After each normal 3A discharge up to a cell voltage of 1.0 V, the zinc electrode was short-circuited with the Raney nickel net. The residual discharge lasted for 20–40 minutes and was terminated when there was no longer any current flow from the zinc electrode to the auxiliary electrode. After 100 cycles, the cell still operated flawlessly and still reached a capacity of about 6 Ah.

EXAMPLE 2

A zinc/nickel oxide cell (constructed as set forth in Example 1) was provided with a nickel net coated with nickel oxide (30 × 60 mm.) disposed on the bottom, instead of with a U-shaped Raney nickel net. This cell contained 8 molar KOH as electrolyte. The cell (about 6 Ah) was charged and discharged with a current of 3A. After respectively 15 cycles, following the normal 3A discharge up to a cell voltage of 1.0 V, a residual discharge was effected for 2–4 hours. The residual discharge current amperate was, at the beginning, about 300 mA, thereafter about 200 mA, and dropped to the value of 0 toward the end within a few minutes. After 120 cycles, no drop in capacity could be observed in the cell.

Short-circuiting of the zinc electrode is effected on top of the cell between the terminal of the zinc electrode and the terminal of the auxiliary electrode either by actuating a switch fixed to the cell top or by clamping a copper bar to both of the terminals. In the above examples, a short lead was plugged into both of the terminals.

With respect to the voltage impressed on the auxiliary electrode and the zinc electrode during residual discharge, the voltage is given by the total resistance of the circuit, but mainly by the internal resistance of the cell; varying with the internal resistance; the range of applied voltages is between 0.1 and 1.0 volts.

Furthermore, it will be understood that the time period usually required for short-circuiting and for impressing additional currents is between 0.5 hour and 5 hours.

While the novel embodiments of the invention have been described, it will be understood that various omissions, modifications and changes in these embodiments may be made by one skilled in the art without departing from the spirit and scope of the invention.

What is claimed is:

1. A process for the operation of rechargeable zinc electrodes in galvanic cells with the aid of a residual discharge, which comprises subjecting a rechargeable zinc electrode in a cell after a normal discharge to an additional and residual discharge by way of at least one auxiliary electrode disposed in said cell in the proximity of the zinc electrode, but galvanically separate therefrom, said additional discharge being effected until almost the entire amount of zinc remaining on the anode formed by the zinc electrode, after the normal discharge, has been oxidized.

2. The process according to claim 1, wherein the residual discharge is connected after each cycle.

3. A process for the operation of rechargeable zinc electrodes in galvanic cells with the aid of a residual discharge, which comprises subjecting a rechargeable zinc electrode in a cell after a normal discharge to a residual discharge by way of at least one auxiliary electrode within said cell, a spontaneous residual discharge being effected by short-circuiting the zinc electrode with the auxiliary electrode, the auxiliary electrode used having a surface made of a material of low hydrogen overvoltage.

4. A process for the operation of rechargeable zinc electrodes in galvanic cells with the aid of a residual discharge, which comprises subjecting a rechargeable zinc electrode in a cell after a normal discharge to a residual discharge by way of at least one auxiliary electrode within said cell, the residual discharge taking place by impressing a current to the zinc electrode from outside of the cell by way of said at least one auxiliary electrode.

5. The process according to claim 1, wherein the auxiliary electrode utilized is made of a metallic material resistant to alkalies.

6. The process according to claim 5, wherein the auxiliary electrode is made of a metal selected from the group consisting of nickel, iron, cobalt, silver or of an oxide of said metal coated on said metal.

7. The process according to claim 5, wherein the auxiliary electrode is nickel coated with nickel oxide.

8. The process according to claim 1, wherein said auxiliary electrode is made of a metal coated with a layer that has a low hydrogen overvoltage.

9. The process according to claim 8, wherein the layer is Raney nickel or nickel boride.

10. The process according to claim 3, wherein the surface is made of Raney nickel or nickel boride.

11. The process according to claim 1, wherein the auxiliary electrode is utilized in the form of porous elements, expanded metals, nets, metal sheets, or fibrous structures.

12. An arrangement for the operation of rechargeable zinc electrodes in galvanic cells with the aid of a residual discharge, comprising a galvanic cell, a zinc electrode providing an anode within said cell, a cathode, and at least one auxiliary electrode in the proximity of the zinc electrode, but galvanically separated therefrom and means for periodically coupling said at least one auxiliary electrode electrically to the zinc electrode whereby said rechargeable zinc electrode is subjected to an additional and residual discharge after a normal discharge by way of said at least one auxiliary electrode, until almost the entire amount of zinc remaining on the anode after the normal discharge has been oxidized.

13. The arrangement according to claim 12, wherein said galvanic cell also includes a nickel oxide cathode.

14. The arrangement according to claim 12, wherein at least one auxiliary electrode is disposed vertically between the anode and cathode.

15. The arrangement according to claim 12, wherein said at least one auxiliary electrode is disposed horizontally underneath the anode.

16. The arrangement according to claim 12, wherein said at least one auxiliary electrode surrounds the anode in a U-shaped configuration.

17. The arrangement according to claim 12, wherein said at least one auxiliary electrode is disposed vertically between the anode and cathode and surrounds the anode in a U-shaped configuration.

18. The arrangement according to claim 12, wherein the auxiliary electrode utilized is made of a metallic material resistant to alkalis.

19. The arrangement according to claim 12, wherein the auxiliary electrode is made of a metal selected from the group consisting of nickel, iron, cobalt and silver or of an oxide of said metal coated on said metal.

20. The arrangement according to claim 12, wherein the auxiliary electrode is nickel coated with nickel oxide.

21. The arrangement according to claim 12, wherein said auxiliary electrode is made of a metal coated with a layer that has a low hydrogen overvoltage.

22. The arrangement according to claim 21, wherein the layer is Raney nickel or nickel boride.

23. The arrangement according to claim 12, wherein the auxiliary electrode is utilized in the form of porous elements, expanded metals, nets, metal sheets or fiber structures.

24. The process according to claim 1, wherein the residual discharge is conducted after a certain number of cycles.

25. The process according to claim 1, wherein said residual discharge is effected by electrically coupling said at least one auxiliary electrode to said zinc electrode.

26. The process according to claim 1, wherein said residual discharge is effected by causing current to flow between and through said at least one auxiliary electrode and said zinc electrode.

* * * * *